United States Patent [19]
Kreyenborg et al.

[11] 3,900,399
[45] Aug. 19, 1975

[54] FILTER APPARATUS FOR EXTRUSION PRESSES

[76] Inventors: Joachim Kreyenborg, Raesfeldstr. 67/69, 44 Munster, Germany; Udo Kreyenborg, Munster Str. 371, 44 Munster, Germany

[22] Filed: Nov. 2, 1973

[21] Appl. No.: 412,189

[30] Foreign Application Priority Data
Nov. 18, 1972 Germany............................. 2256639

[52] U.S. Cl. ................ 210/236; 210/398; 210/445; 210/447; 210/451; 210/453; 210/455; 210/477; 210/489; 210/492; 210/497; 210/498; 425/185
[51] Int. Cl.²......................................... B01D 27/08
[58] Field of Search.................... 425/185, 197, 199; 210/171, 234, 236, 241, 359, 398, 399, 445, 446, 447, 451, 453, 455, 477, 492, 497, 498, 488, 335, 489

[56] References Cited
UNITED STATES PATENTS

| | | | |
|---|---|---|---|
| 2,294,330 | 8/1942 | Clark | 210/335 |
| 3,007,199 | 11/1961 | Curtis | 425/185 |
| 3,259,248 | 7/1966 | Wiegand | 210/488 |
| 3,589,163 | 6/1971 | Byrne et al. | 425/185 |
| 3,743,101 | 7/1973 | Schmidt | 210/447 |
| 3,804,758 | 4/1974 | Cooper et al. | 210/236 |

*Primary Examiner*—John Adee
*Assistant Examiner*—F. F. Calvetti
*Attorney, Agent, or Firm*—Merchant, Gould, Smith & Edell

[57] ABSTRACT

Filter apparatus for extrusion presses and injection molding machines which continuously process thermoplastic substances is disclosed which provides a main screen cylinder including a plurality of screen filter sets positioned in a plurality of screen chambers. The main screen cylinder is movable through the bore of a housing to successively present the screen chambers to a source of plastic material under pressure for filtering. The main screen cylinder is formed from a plurality of separate screen supporting cylinders, each of which includes at least one of the successive screen chambers. The plurality of separate screen supporting cylinders are positioned in axial alignment for movement through the axial bore so that a used screen supporting cylinder may be removed from one end of the main screen cylinder, cleaned and repositioned at the other end of the main screen cylinder for subsequent presentation to the source of plastic material under pressure without appreciable interruption of the flow of plastic material through other screen chambers and respective screen filter sets.

4 Claims, 3 Drawing Figures

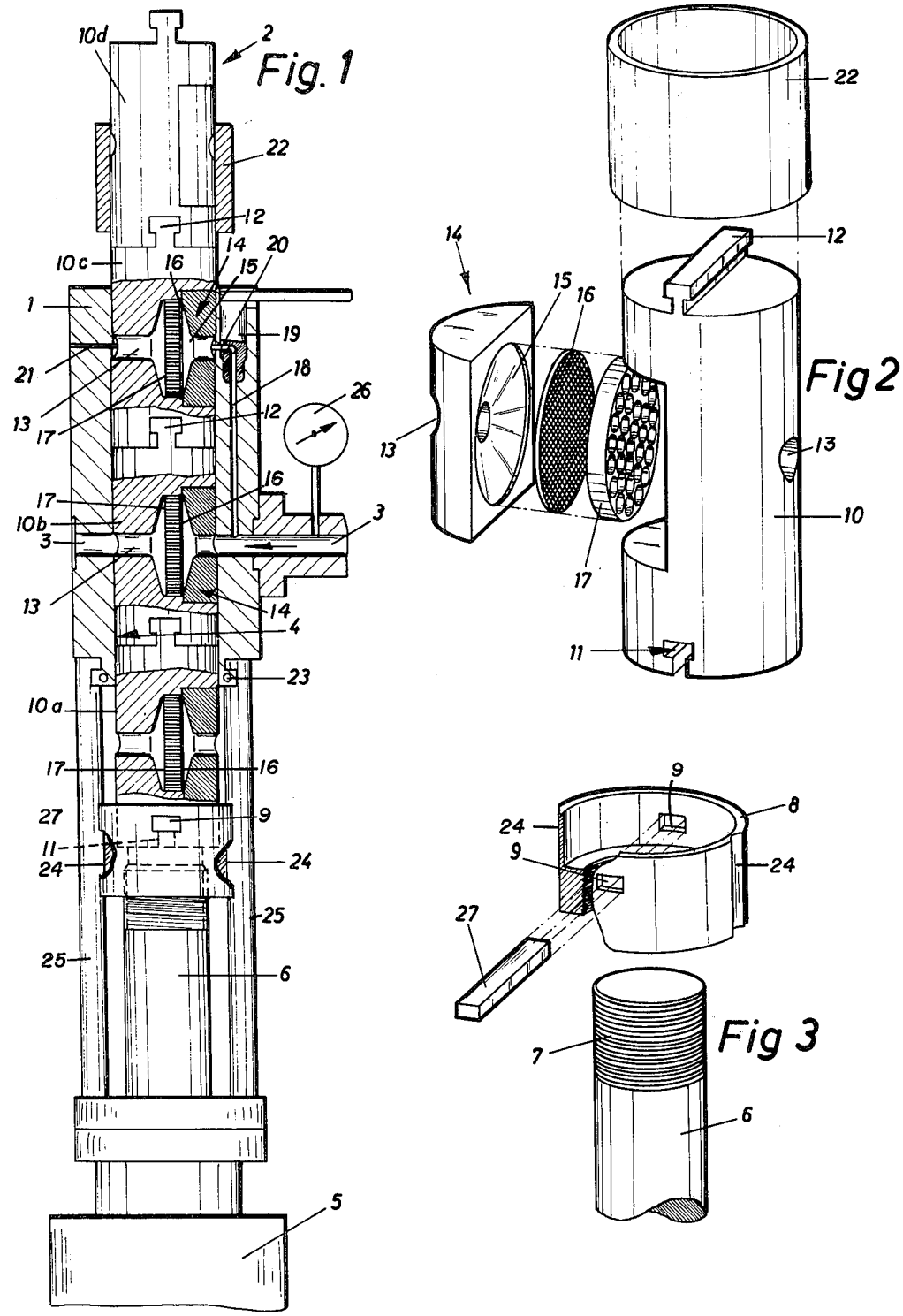

FILTER APPARATUS FOR EXTRUSION PRESSES

BACKGROUND OF THE INVENTION

1. Field of the Invention:

The invention relates to a filtering apparatus for extrusion presses and injection molding machines, in particular worm extrusion presses, for the continuous processing of thermoplastic substances, with a screen cylinder, which is arranged perpendicularly of the direction of flow of the plastic material and is slidable, in suctionally tight manner in a bore of the machine housing, this screen cylinder having a number of sets of screens which are arranged in successive screen chambers or spaces.

2. Description of the Prior Art:

Filtering apparatuses for extrusion presses and injection molding machines, and which operate with sets of screens located in the screen spaces, are already known. The filtering apparatus serves the purpose of isolating dirt and contaminating substances, contained in the raw material, from the finished product. It will be apparent that filtering apparatuses of this kind have to be exchanged and cleaned from time to time. It has already been proposed, in German Pat. No. 1,097,660, to so position a screen that — without stopping the extrusion press and simply by swivelling a handle — clean section of the screen would be brought into position in front of the outlet opening of the extruder. In this way, it is ensured that it is only necessary to stop the extruder to completely clean the screen. After a relatively large number of such screen replacements, however, the extrusion press still has to be occasionally stopped and the screen removed and cleaned. The drawback will then again be encountered that, when the new screens are being inserted, air cannot escape, and a disturbance in production takes place.

If a rapidly exchangeable double perforated plate, equipped with screen inserts and formed as a slidable wedge element, is used (German Auslegeschrift No. 1,198,537), an interruption of the flow of the plastic material used is brought about during sliding movements of the plate, upon exchanging or replacing the screen. This interruption in the flow of the plastic material is caused by included air, and gives rise to disturbances in operation.

German Pat. No. 1,554,913 proposes, for the purpose of eliminating these drawbacks, a filtering apparatus in which a slider element is suctionally tightly arranged in a housing bore. This slider functions as a slider pin or cylinder and defines — for the purpose of expelling, in the course of its sliding movements, air which has been included in the screening spaces or chambers — small openings between the edges of the housing bore and the respective screening spaces, which latter spaces are moved in this housing bore. Thus, means are provided for causing included air to be expelled without difficulty and for avoiding disturbances in production and interruption in the extrusion work, such as had hitherto taken place.

However, it is an inherent feature of this known apparatus that when, apart from the necessity of replacing the screens themselves, work has to be carried out on the screening space (chamber) or screening pins (cylinders) — which work has to be carried out in a workshop — the extrusion press must be stopped, so that the whole screen pin or cylinder, which incorporates a number of screening chambers or spaces, can be exchanged. It is, in fact, possible to exchange individual screens without stopping the extrusion press, but this replacement frequently has to be carried out under unfavorable local conditions.

SUMMARY OF THE INVENTION

The present invention has the object of providing a filtering apparatus in which exchange of the screen pin or cylinder is possible without continuity of the extrusion press being adversely affected, and which appreciably facilitates the work entailed in replacing the individual filtering screens. This object is realized by arranging for the screen pin or cylinder to incorporate a number of screen supporting cylinders, each of which comprises a screen space or chamber, and which are form-lockingly attached to one another in their axial direction.

A pulling unit may be attachable to the lowermost screen supporting cylinder of the screen cylinder, and is preferably hydraulically actuated.

Through the use of this apparatus, it is possible, when a screen has become dirtied, to rapidly replace the dirtied screen, without thereby interrupting the continuity of the extrusion work. The screen supporting cylinder or cylinders, which have thus become free, can now be released from the screen cylinder proper by virtue of the form-locking attachment, and between the screen supporting cylinder or cylinders thus released can be suitably cleaned or subjected to some other necessary treatment without the extrusion press having to be stopped. The screen supporting cylinder which has thus been cleaned can be connected to the uppermost screen supporting cylinder in the housing of the extrusion press, after this cleaned screen supporting cylinder has been suitably preheated to the working temperature. Thus, a continuous exchange of the individual screens becomes possible, without it being necessary to stop the injection molding machine on account of this screen change.

Further, according to the invention, an overflow duct is provided which opens out into the trough bore for the synthetic plastic material, and also into the screen space or chamber of the adjacent, cleaned screen supporting cylinder. Functioning of this overflow duct is controllable by means of a valve, interposed in the overflow duct.

Preferably, the form-locking connection between the individual screen supporting cylinders is accomplished by way of a T-shaped tongue and groove joint. The plunger of the hydraulic unit can be equipped, at one of its ends, with a sleeve whose inner diameter is complementary to the outer diameter of the screen supporting cylinder and which has bores, which are in alignment with the groove formed in the screen supporting cylinder and serve to receive a connecting bar or pin. The sleeve itself can be fixed to the plunger through the intermediary of a screwthread, so that alterations in height of the sleeve and, accordingly, of the bore can be effected without difficulty.

According to a modification of the proposed apparatus, the valve is capable of assuming, apart from a close position, a position in which the overflow duct can communicate either with a screen space or with the outside atmosphere. According to a further modification of the invention, exchange of the screen supporting cylinder and, accordingly, a switchover of the condition of the valve, are automatically initiated in consequence of the pressure in the through bore. The invention also makes provision for a combination of a pressure-dependent and of a time-dependent changeover, that is to say the hydraulic unit comes into operation a certain time after the switchover in the condition of a valve, this latter-mentioned switchover of the valve being initiated by a pressure condition. A bore, formed in the housing, is in alignment with, and is positioned opposite, the point at which the overflow duct opens into the through bore, provided in the screen supporting cylinder. This bore in the housing leads to the outside atmosphere, and enables air to be discharged from the screen space or chamber.

According to a further feature of the invention there is proposed, for the purpose of enabling the separate screen supporting cylinders to be satisfactorily and readily centered, a centering ring, which can be set down on the uppermost screen supporting cylinder, which has itself just been set down. This centering ring engages round the attachment point between two screen supporting cylinders and the lower edge of the combination, inserted as a unit, composed of the flow guiding element, a set or packet of screens, and a perforated plate.

BRIEF DESCRIPTION OF THE DRAWINGS

FIG. 1 is a side view, with partial cross-sectioning, of the novel screen cylinder or pin;

FIG. 2 is an exploded perspective view of a screen supporting cylinder, and

FIG. 3 is an exploded perspective view of means for attaching the screen supporting cylinder to the hydraulic unit.

In FIG. 1, reference numeral 1 generally designates a housing, in which filter means in the form of a main screen cylinder 2 is mounted so as to be shiftable, within an axial bore 4 of the housing 1. Axial bore 4 extends transversely of a transverse or through bore 3. A thermoplastic substance, not shown, which is to be processed, flows through the through bore 3 in the direction of the arrow. The housing 1 has been shown partially cut away so as to simplify representation of the inventive principle. A hydraulic unit 5 adjoins the lower end of the housing 1. A plunger 6 of this hydraulic unit 5 can be seen in the drawing, and carries, at its upper end, through the intermediary of a screwthread 7, a sleeve 8, which has a cooperating internal screwthread. Bores 9 are formed to lie in mutually opposite diametral relationship in the sleeve 8.

The main screen cylinder proper 2 is constituted by a number (four in the embodiment illustrated) of screen supporting cylinders 10a through 10d, which are attached together through a tongue and groove connection. With this in view, there is provided, for example, a T-shaped groove 11 at the lower end of each screen supporting cylinder 10a–10d, and a T-shaped tongue 12 at the upper end of each screen supporting cylinder 10a–10d. Thus, a tongue 12 can be brought into form-locking engagement with a groove 11 of a following screen supporting cylinder 10a–10d so that, when a pulling force is exerted on the preceding screen supporting cylinder 10a in the axial direction of axial bore 4, following screen supporting cylinders 10b–10d will be securely attached to the following and to the preceding screen supporting cylinders, as illustrated in FIG. 1.

Each separate screen supporting cylinder 10a–10d is, for example, of circular shape, and has a through bore 13. A screen centering element 14 is inserted into the screen supporting cylinder, and is formed with a recess 15, which serves to uniformly distribute the thermoplastic substance, introduced through the through bore 13, on to the whole surface of a screen. The screen itself is constituted by a set or package of screens 16 and a perforated plate 17; these two components are centered, in their position in the screen supporting cylinder, by the screen centering element 14. A further flow guiding recess adjoins the perforated plate 17, which recess lies in the rear as considered in the direction of flow of the thermoplastic substance to be processed. This flow guiding recess guides the substance to be processed into the through bore 13. In the position in which the apparatus is ready for operation, the through bore 13, formed in each of the screen supporting cylinders 10a–10d, lies in alignment with the through bore 3, formed in the housing 1.

An overflow duct 18 opens out into the through bore 3 upstream of the point at which this bore 3 enters the screen supporting cylinder 10a–10d concerned. This overflow duct 18 is equipped, at its upper end portion, with a valve 19 which has an opening 20, leading to the through duct 13 in the screen supporting cylinder which directly follows the screen supporting cylinder 10b, that is, screen supporting cylinder 10c (as shown in FIG. 1) when in use. A further opening (not shown) of valve 19 leads to the outside atmosphere.

A vent bore 21, formed in the housing 1, lies opposite the opening 20. This vent bore 21 also opens out to the outside atmosphere, and is connected to, or lies in alignment with, the through bore 13, of screen supporting cylinder 10c.

A centering ring is designated as 22 in the drawing and serves to engage the edge, which may be formed when two screen supporting cylinders 10 lie adjacent one another. The centering ring 22 also serves to hold in position the screen centering element 14 of the screen supporting cylinder 10d which extends upwardly from the housing 1.

As is indicated at 23 in the drawing, the housing 1 may be equipped, at its upper and lower ends, with cooling ducts which ensure solidification of a very dilute synthetic plastic material.

With a view to preventing rotation of the screen supporting cylinders 10a–10d and, consequently, sleeve 8, the latter is guided by way of suitable grooves 24, which engage the vertical columns designated as 25 in the drawing. The columns 25 serve to secure the housing 1 and hydraulic unit 5 together with the plunger 6 axially aligned with axial bore 4.

The construction and the mode of operation of the apparatus according to the invention are as follows:

The plasticized synthetic plastic material, flowing through the through bore 3, bears foreign bodies and other substances which have not been decomposed, and which are retained in the set or package of screens 14. Accordingly, there is an increase in pressure in the right-hand half (as shown in the drawing) of the through bore 3. This increase in pressure can be read off on a contact monometer 26. When this pressure exceeds a certain value, the valve 19 can become operative, controlled either automatically or by hand, so that, when the valve is in a first switching position, its opening 20 communicates with the outside atmosphere and the decomposed and degraded synthetic plastic material present in the overflow duct 18 is directed to the outside atmosphere. Steps may at the same time be taken to interrupt the flowthrough for the cooling ducts 23, so that the mass of sealing material becomes plasticized during the time in which a screen changeover is taking place. When the overflow duct 18 has been rinsed free, the valve 19 switches into the position illustrated in the drawing, so that plasticized plastic material now flows from the overflow duct 18 into the screen supporting cylinder 10a which is positioned above the screen supporting cylinder 10b at present in operation. This synthetic plastic material thrusts in front of it the air present in the screen supporting cylinder 10c, and this is continued until the synthetic plastic material discharges to the outside atmosphere through the bore 21. The hydraulic apparatus 5 now becomes operative, this occurring automatically or being controlled by hand, with the result that the plunger 6 is abruptly downwardly shifted through a distance such that the previously charged screen supporting cylinder 10c lies with its through bore 13 in front of the through bore 3. The pressure is thereby abruptly reduced in the through bore 3, and the valve 19 is guided into its closed position. The single interruption of the flow of the synthetic plastic material lasts for the period of time which is required for bringing the screen supporting cylinder 10c from its inoperative position, illustrated in the drawing, into its operative position (also illustrated in the drawing as the portion of screen supporting cylinder 10b), in which it lies in front of the through bore 3. This period of time lasts for a matter of fractions of a second, so that there is no appreciable interruption in production such as would be noticeable from the outside.

On the occasion of the downward movement of the main screen cylinder 2, the centering ring 22 rests on the upper edge of the housing 1, and is upwardly shifted.

The lowermost screen supporting cylinder 10a is locked to the sleeve 8 by means of a connecting bar or pin 27. This connecting bar 27 is released, and the plunger 6 is driven a further short distance in the downward direction, so that the lowermost screen supporting cylinder 10a can now be removed from the main screen cylinder 2, and can be cleaned at some other place. The screen supporting cylinder 10a which has been cleaned, and which may possibly also have been renewed or overhauled in other respects, is subsequently set down on the uppermost screen supporting cylinder 10d, preferably after it has been heated to the working temperature of the thermoplastic substance. Accordingly, the housing 1 will only contain screen supporting cylinders 10a–10d which have the necessary working temperature.

When the lowermost screen supporting cylinder 10a has been removed, the plunger 6 of the hydraulic unit 5 is once again raised, and sleeve 8 is attached, through the intermediary of the connecting bar or pin 27, to the next screen supporting cylinder 10b to be soiled.

The arrangement according to the invention affords the advantage that it becomes possible, particularly in the case of thermoplastic substances, (which tend to rapidly become degraded and decompose) to vent (deaerate) the screen chamber or space of the new screen supporting cylinder in a simple manner and shortly before a screen changing operation. Consequently, decomposition cannot now take place in this screening space.

We claim:

1. Appratus for processing plastic material, and comprising:
  a. a housing having an axial bore of predetermined length and a transverse bore, extending through said axial bore, for connection to a source of plastic material;
  b. filtering means mounted in said axial bore for movement axially therein, and including a plurality of screen chambers spaced therealong and having through bores adapted for alignment with said transverse bore, and
  c. power means for advancing said filtering means through said axial bore to bring said through bores successively into alignment with said transverse bore, in which apparatus said filtering means comprises a plurality of adjacent, individual screen supporting cylinders shorter than said axial bore, each including at least one of said screen chambers and each having complimentary coupling means extending transversely across its ends for form-locking connection with adjacent cylinders to prevent rotation and axial separation therebetween, wherein said complimentary coupling means comprises:
  d. a transverse T-shaped tongue on one end of each screen supporting cylinder; and
  e. a cooperating transverse T-shaped groove formed in the other end of each screen supporting cylinder.

2. Appratus for processing plastic material, and comprising:
  a. a housing having an axial bore of predetermined length and a transverse bore, extending through said axial bore, for connection to a source of plastic material;
  b. filtering means mounted in said axial bore for movement axially therein, and including a plurality of screen chambers spaced therealong and having through bores adapted for alignment with said transverse bore, and
  c. power means for advancing said filtering means through said axial bore to bring said through bores successively into alignment with said transverse bore, in which apparatus said filtering means comprises a plurality of adjacent, individual, mutually abutting screen supporting cylinders shorter than said axial bore, each including at least one of said screen chambers and each having complimentary coupling means extending transversely across its ends for form-locking connection with adjacent cylinders to prevent rotation and axial separation therebetween, wherein said power means includes:
  d. a plunger arranged for linear movement and having a free end;
  e. a sleeve connected to said free end of said plunger and having a transverse internal dimension generally corresponding to the transverse external dimension of said screen supporting cylinders;
  f. aligned diametrically disposed passages in said sleeve for alignment with one coupling means of a screen supporting cylinder positioned in said sleeve; and
  g. a connecting bar receivable through said aligned bores and coupling means to detachably secure said screen supporting cylinder to said sleeve and power means, said sleeve having internal means for providing axial adjustment of said filtering means relative to said plunger, and external means for preventing rotation thereof with respect to said housing.

3. An improved filter apparatus for extrusion presses and injection molding machines which continuously process thermoplastic substances, the extrusion presses and injection molding machines having:
   a. a housing including an axial bore and a transverse bore formed therein, the transverse bore extending through said axial bore and being connected to a source of plastic material under pressure;
   b. a main screen cylinder mounted in said axial bore for movement axially thereof, main screen chambers formed therein and a through bore extending through each of said screen chambers for successive presentation to said transverse bore to receive plastic material for passage therethrough;
   c. a plurality of screen filter sets mounted one set in each screen chamber, said improved filter apparatus comprising:
      i. said main screen cylinder including a plurality of separate screen supporting cylinders, each including at least one of said successive screen chambers and respective through bores; and
      ii. means for detachably securing said plurality of said screen supporting cylinders to each other whereby a used screen supporting cylinder at one end of the main screen cylinder may be detached from and, subsequent to cleaning of the used screen filter set, re-attached to the other end of said main screen cylinder, without appreciable interruption of the flow of plastic material through said transverse bore, wherein each of said screen supporting cylinders includes a screen centering element formed as a chord to said cylindrical shape, which screen centering elements are removable to gain access to respective screen chambers, and wherein centering means aligns said screen centering element and respective screen supporting cylinder attached to said main screen cylinder externally of said housing for subsequent entry of said external screen supporting cylinder into said axial bore.

4. The structure of claim 3 wherein said centering means is a centering ring which encircles the detachable connections of said exterior screen supporting cylinder, a preceding screen supporting cylinder and at least a portion of said screen centering element on said exterior screen supporting cylinder.

* * * * *